United States Patent

[11] 3,588,225

| | | |
|---|---|---|
| [72] | Inventor | Lawrence Joseph Nicastro<br>Philadelphia, Pa. |
| [21] | Appl. No. | 6,060 |
| [22] | Filed | Jan. 27, 1970 |
| [45] | Patented | June 28, 1971 |
| [73] | Assignee | RCA Corporation |

[54] ELECTRO-OPTIC DEVICES FOR PORTRAYING CLOSED IMAGES
8 Claims, 4 Drawing Figs.

[52] U.S. Cl. ............................................. 350/160
[51] Int. Cl. ............................................. G02f 1/28
[50] Field of Search............................... 350/160, 267

[56] References Cited
UNITED STATES PATENTS
3,497,286  12/1970  Morton et al. ................ 350/160

*Primary Examiner*—Ronald L. Wibert
*Assistant Examiner*—V. P. McGraw
*Attorney*—Glenn H. Bruestle ABSTRACT: An electro-optical device for portraying closed images comprises at least two electro-optical cells in tandem. Each cell has a medium which is capable of modulating light in response to an applied voltage thereacross and electrodes on opposite sides of the medium for applying a voltage thereacross. The electrodes on at least one side of the medium of each cell consists of a plurality of separate electrodes so as to define an open electrode pattern. This pattern corresponds to a portion of the desired closed image to be portrayed. The individual cells of the device are arranged with respect to one another in a manner such that in operation the desired closed pattern is portrayed by the composite of the open patterns of the individual cells. Typical electro-optical medium is a nematic liquid crystal composition.

INVENTOR
*Lawrence J. Nicastro*
BY
ATTORNEY

ELECTRO-OPTIC DEVICES FOR PORTRAYING CLOSED IMAGES

BACKGROUND OF THE INVENTION

This invention relates to electrooptical light modulating devices and particularly to devices capable of displaying closed patterns without the need for feedthroughs or electrode crossover isolation.

This invention deals with means for portraying closed images. A closed image, as used herein, is an image which consists, at least in part, of a closed figure, such as a circle or a polygon, within which exist other portions of the image to be portrayed. The closed figure need not be of any regular shape. Generally, electrooptical devices such as liquid crystal devices or electroluminescent devices, consist of an active medium and electrode means on opposite sides of this medium for activating it. The medium is primarily activated only in the region of overlap of the electrodes on opposite sides thereof.

A problem of providing electrical contacts in such devices arises when one wants to activate isolated enclosed electrode patterns. For example, if one desired to portray varying patterns consisting of concentric circles, in order to make contact with an electrode forming an inner circle one would either have to provide feedthrough through the substrate on which the electrode is formed to separately contact each such circular electrode or one would have to provide isolation of leads which crossover a surrounding circular electrode. Both of these approaches are undesirable and have various problems associated therewith.

The present invention describes a unique device structure for portraying closed patterns with electrooptical devices which eliminates both the need for feedthroughs and the need for crossover electrodes requiring isolation.

SUMMARY OF THE INVENTION

An electrooptical light modulating device for portraying a predetermined closed image comprises a medium capable of modulating light in response to an applied voltage and two sets of electrodes for applying voltages to the medium. A portion of the medium is disposed between the electrodes of each set. Each set of electrodes includes a shaped portion defining an open pattern corresponding to a different part of the desired closed image. The electrode patterns of the different sets are arranged with respect to each other such that the desired closed image is formed from the composite of the open images formed by each set of electrodes.

DESCRIPTION OF THE PREFERRED EMBODIMENT

Figure 1:
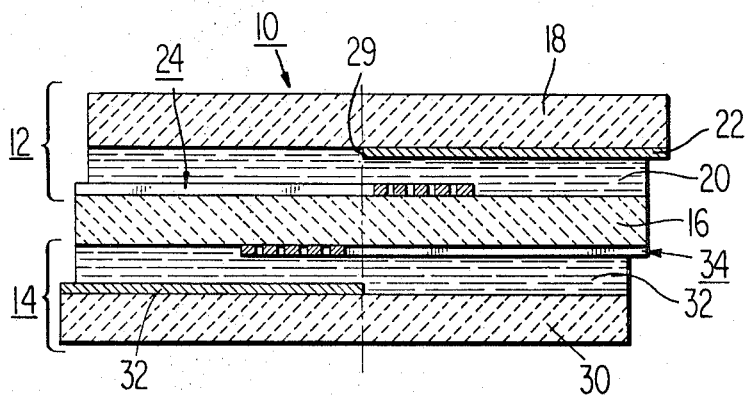
FIG. 1 is a cross-sectional view of an electrooptical device utilizing a nematic liquid crystal medium as the active light modulating medium.
Figure 4:
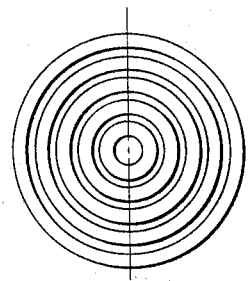
FIG. 4 is the composite image portrayed by the device of FIG. 1 due to light passing therethrough when the device is activated.

Referring to FIG. 1, there is shown a liquid crystal device 10 useful for portraying patterns consisting of concentric circles such as that shown in FIG. 4.

Figure 2:
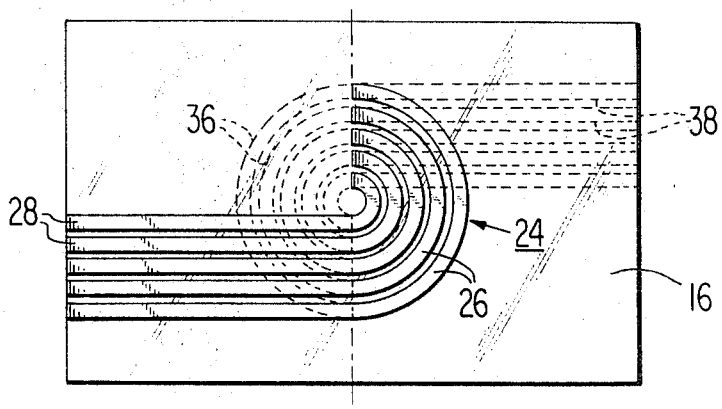
FIGS. 2 and 3 are plan views of electrode patterns on each of the two cells comprising the device.

The device 10 comprises two electrooptical cells 12 and 14 arranged in tandem and having a transparent common support plate 16. The first cell 12 comprises a first transparent support plate 18, spaced from the common support plate 16. The space between these support plates 16 and 18, which is typically from one-fourth to one-half mil, is filled with a first nematic liquid crystal composition 20. A useful composition comprises equimolar amounts of
p-anisylidene-p'-aminophenylacetate,
p-butoxybenzylidene-p'-aminophenylacetate,
p-anisylidene-p'-aminophenylbutyrate A first continuous transparent conductive electrode 22 is provided on the inner surface of the first support plate 18. This conductive electrode 22 is in contact with the liquid crystal composition 20 and completely covers the right half of the first support plate 18. The surface of the common support plate 16 which faces the support plate 18 is provided with a patterned transparent electrode array 24 which is in contact with the first liquid crystal composition 20. The pattern of the electrode array 24 corresponds to only a portion of the desired image to be portrayed. The electrodes of the particular electrode array 24, as shown in FIG. 2, consists of a concentric semicircular portion 26 having parallel linear extensions 28 extending from one end of each of the semicircles. The concentric semicircles are positioned such that the diameter defining the semicircles 26 lies directly under the inner edge 29 of the first continuous electrode 22 and the semicircular portion 26 lies wholly under the first continuous electrode 22. The linear extensions 28 extend from the semicircles 26 to the left end of the common support plate 14. In this way, the linear extensions 28 do not overlap the first continuous electrode 22.

The first cell 12 is operated by applying a voltage across the liquid crystal composition between the first continuous electrode 22 and any one or combination of individual electrodes which comprise the electrode pattern 24. The liquid crystal composition will be activated only in the region of electrode overlap. Consequently, only the activated semicircular regions 26 of the electrode pattern 24 will cause an image to be seen by one watching either light transmitted through the device or light reflected from the device.

Figure 3:
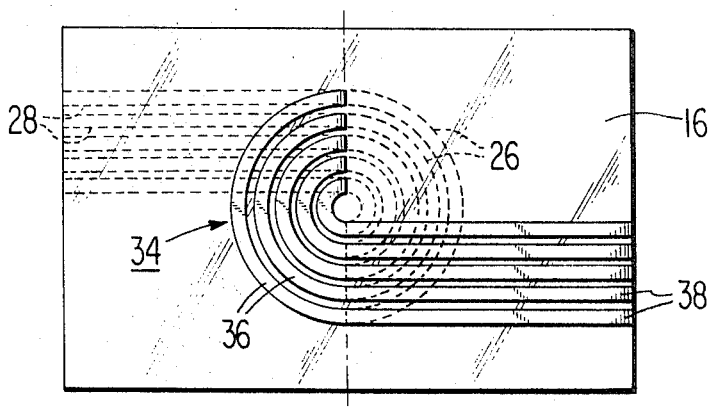

The second cell 14 is similar to the first cell 12. This cell 14 comprises, a second support plate 30 spaced from the common support plate 16; a second continuous transparent electrode 32 on the inner surface of the second support plate 30; a liquid crystal composition 32 as described above filling the space between the second support plate 30 and the common support plate 16; and a second transparent patterned electrode array 34 as shown in FIG. 3 which corresponds to and provides the remaining portion of the desired image and consists of concentric semicircles 36 and parallel linear extensions 38 from an end thereof. The linear extensions 38 of the electrodes of the second electrode array 34 extend to the right edge of the common support plate 16. The second continuous electrode 32 covers the entire left half of the second support plate 30. In the same manner as described with reference to the first cell 12, the entire semicircular portion 36 of the second electrode array 34 overlaps the continuous electrode 32 while the linear extensions 38 do not overlap the continuous electrode 32.

The first and second cells are arranged such that the image formed from the composite of these cells appears as complete concentric circles. This is achieved by having the diameters of each of the two semicircular patterns lie in a common plane which plane is perpendicular to the surface of the device. However, to negate any error due to paralax one may slightly overlap the edges of the concentric circular patterns.

By applying a voltage between each set of electrodes, that is, between any selected one or more of the electrodes in each electrode array and the respective continuous electrode of each cell, one can form images of different combinations of circles.

It should be understood that the invention lies in the arrangement of the electrodes in electrooptical cells such that the composite image formed by the electrode arrays in different sets of electrodes can include a closed image while the electrode arrays of each set of electrodes making up the composite is in the form of an open pattern. In this way the novel device does not require feedthroughs or crossovers.

Consequently, the invention is not limited to devices where the active electrooptical medium is a nematic liquid crystal. Nor is it limited to the cell configuration shown.

In another configuration, the individual cells comprising the novel device may be completely separated. That is, there is no need of a common support plate. However, use of such a common support plate enables a closer proximity of electrode patterns and reduces paralax effects. On the other hand, the use of separated cells allows for adjustment of the pattern alignment.

The portrayal of concentric patterns, such as concentric circles, where one can vary which and how many circles are activated is particularly useful for printing coded information.

I claim:

1. An electrooptical device for forming a predetermined closed image comprising:
   a. a medium capable of modulating light in response to an applied voltage;
   b. two sets of electrodes for applying voltages to said medium;
   c. a portion of said medium being disposed between the electrodes of each of said sets;
   d. each set of electrodes including a shaped portion in an open pattern corresponding to a different part of said closed image; and
   e. said patterns being disposed in relation with each other to produce a composite pattern corresponding to said closed image.

2. The electrooptical device as recited in claim 1 wherein said light modulating medium comprises a liquid crystal composition.

3. An electrooptical device for forming desired closed images comprising at least two electrooptical cells arranged in tandem, each cell comprising:
   a. a medium capable of modulating light in response to an applied voltage; and
   b. electrode means adjacent said medium for applying a signal thereto, said electrode means including an open electrode pattern said pattern corresponding to a different portion of said desired closed image, and wherein the electrode patterns of the different cells of said device are arranged in a manner such that said desired closed image is portrayed by the composite of said open patterns of said individual cells.

4. The electrooptical device as recited in claim 3 wherein said light modulating medium comprises a liquid crystal composition.

5. The electrooptical device as recited in claim 3 wherein said electrode means of each cell consist of a first electrode on one side of said medium, said open electrode pattern consisting of a first portion and a second portion extending therefrom, said first portion completely overlapping said first electrode and wherein said first portion of said electrode pattern corresponds to part of said desired closed image.

6. The electrooptical device recited in claim 3 wherein said desired closed image comprises concentric patterns and wherein said open electrode pattern of each cell comprises portions of said concentric patterns.

7. The electrooptical device as recited in claim 6 wherein said concentric patterns consist of concentric circles.

8. An electrooptical device for portraying concentric closed images comprises two electrooptical cells arranged in tandem, said electrooptical cells each consisting of a nematic liquid crystal medium, a first and a second electrode means on opposite sides of said medium for applying a voltage thereacross, said first electrode means being a continuous transparent electrode, said second electrode means consisting of an open pattern of transparent conductive electrodes, said pattern including a first portion completely overlapping said continuous electrode said first portion being part of said concentric closed image, and a second portion extending away from said continuous electrode so as not to overlap therewith, and said two electrooptical cells arranged with respect to each other such that the composite image formed by each cell portrays the desired concentric closed image of the device.

UNITED STATES PATENT OFFICE
CERTIFICATE OF CORRECTION

Patent No. 3,588,225          Dated June 28, 1971

Inventor(s) Lawrence Joseph Nicastro

It is certified that error appears in the above-identified patent and that said Letters Patent are hereby corrected as shown below:

In Claim 5, Column 4, line 9, after medium, insert the following: --and an open electrode pattern on the opposite side of said medium,--

Signed and sealed this 9th day of November 1971.

(SEAL)
Attest:

EDWARD M. FLETCHER, JR.
Attesting Officer

ROBERT GOTTSCHALK
Acting Commissioner of Patents